United States Patent [19]

Spiegelman et al.

[11] 4,433,828
[45] Feb. 28, 1984

[54] REACTOR VESSEL STUD CLOSURE SYSTEM

[75] Inventors: Stanley R. Spiegelman, Churchill; Robert B. Salton, Plum Borough; Robert W. Beer, Murrysville; Louis J. Malandra, Boston, all of Pa.; Michael L. Cognevich, Houston, Tex.

[73] Assignee: Westinghouse Electric Corp., Pittsburgh, Pa.

[21] Appl. No.: 229,362

[22] Filed: Jan. 29, 1981

[51] Int. Cl.³ .................................... E21B 19/00
[52] U.S. Cl. .................................... 254/29 A
[58] Field of Search .......... 279/110, 66; 254/29 A; 81/57.38; 29/452

[56] References Cited

U.S. PATENT DOCUMENTS

| | | | |
|---|---|---|---|
| 3,995,828 | 12/1976 | Orban | 254/29 A |
| 4,074,890 | 2/1978 | Boudet et al. | 254/29 A |
| 4,175,453 | 11/1979 | Exner et al. | 254/29 A |
| 4,315,446 | 2/1982 | Orban | 254/29 A |

*Primary Examiner*—Robert C. Watson
*Attorney, Agent, or Firm*—E. F. Possessky

[57] ABSTRACT

A quick-acting stud tensioner tool for enabling the loosening or tightening of a stud nut on a reactor vessel stud. The tool engages the vessel stud by closing a gripper mechanism around an upper end of the vessel stud upon a transfer of the mass of the tool from a hoist to a support structure surrounding the vessel stud. After the stud has been elongated, the gripper mechanism releases the vessel stud when the mass of the tool is transferred from the support structure surrounding the vessel stud to the hoist.

13 Claims, 2 Drawing Figures

REACTOR VESSEL STUD CLOSURE SYSTEM

BACKGROUND OF THE INVENTION

This invention relates to a tool used during a refueling cycle of a nuclear reactor, and more specifically, to a device for applying tension to and removing tension from a vessel stud and nut combination which attaches a head of a reactor pressure vessel to the reactor vessel in a nuclear power plant.

The pressure vessel head is attached to a flange along an upper perimeter of the reactor vessel by a plurality of vessel studs with nuts. The studs are inserted through a hole in the vessel head and screwed into the vessel flange. A stud tensioner tool is used to compress a seal between the vessel head and the vessel flange. While seal compression is maintained, the nut on the vessel stud is rotated clockwise to tighten down on the stud so that the seal is retained when the stud tensioner tool is relaxed.

The vessel studs and attached nuts are removed from the reactor vessel at the beginning of a refueling cycle. The stud tensioner tool is again used to compress the seal between the vessel head and the vessel flange. The stud nut is then loosened a few turns so that the nut will remain loose after the stud tensioner tool is relaxed. Once all vessel studs have been detensioned, the studs and attached nuts are removed from the vessel flange. The vessel head may thereafter be lifted from the reactor vessel.

A stud tensioner tool comprises some means for engaging the top of the vessel stud above the nut plus means for applying a force to elongate the stud. "Elongation" refers to the lifting of the top of the vessel stud relative to the upper surface of the vessel head, the net effect being a compression of the seal between the reactor vessel flange and the vessel head. The force of elongation is commonly applied by a hydraulic cylinder assembly. The means for engaging the top of the vessel stud, however, has involved several arrangements.

Of the known prior art, the primary means for engaging the stud involves manually screwing the relevant portion of the tensioner tool onto the top of the vessel stud for approximately six turns. Once the stud is fully engaged and the elongation force is applied, the nut is automatically rotated in the appropriate direction by a nut turning device. When the nut has reached the desired position, the elongation force is relaxed and the tensioner tool is manually removed from the stud by an operator.

Engagement of the stud, when done by manual screwing, constitutes a significant percentage of the total time required to detension a stud. Time, during the stud tensioning, or detensioning, process, is important for two reasons. First, due to moderate radiation fields in the region of the studs, a significant dose accumulation of radiation is received by operating personnel during the stud detensioning process. The problem of radiation exposure is further complicated by the general trend of the Nuclear Regulatory Commission toward reduction of the allowable dosage of radiation to operating personnel.

The second reason that time is important arises from the significant cost to the utility when the reactor is down. Any decrease in the overall length of time required to refuel the reactor results in substantial financial savings to the utility. Improving the means by which the tensioner tool engages the vessel stud is thus a likely target for increasing refueling efficiency.

One prior art improvement seeks to minimize the amount of time spent screwing the tensioner onto and off of the stud by introducing a motorized screwing system. This improvement replaces the manual screwing motion of the operator with an automatic screwing system. While this improvement effectively increases the time efficiency of stud engagement, a concurrent increase in complexity of the tool results in more down time for maintenance and repair and a higher cost for tool production.

A second prior art improvement directed to the efficiency of the stud engagement process eliminates altogether the need for screwing the tool onto the stud. This is accomplished by breaking the portion of the tensioner having female threads into several sections. The sections may be drawn apart to increase the inner diameter of the stud engagement portion of the tool. This permits the tool to be inserted over the top of the stud, after which the sections are closed around the circumference of the vessel stud to effect engagement. This radial motion is accomplished by use of hydraulic cylinders.

The section-type engagement system operated by hydraulic cylinders is quite effective in reducing the time required for stud engagement. Its use, however, requires the addition of a second hydraulic system with its attendant need for periodic maintenance and repairs. The additional hydraulic system also increases the cost of the tool.

A third prior art approach to improving the stud tensioner tool utilizes a method of engaging the vessel stud known as roto-lock engagement. This improvement requires the use of a specially constructed stud. The threads on this stud, rather than being continuous around the circumference of the stud, are divided into three columns. The three columns of threads are separated by three columns of smooth stud surface without threads. The female threads of the stud engagement surface located inside the stud tensioner are constructed in a complimentary arrangement of three columns.

The stud is engaged by inserting the stud tensioner over the roto-lock stud so that the female threads of the stud tensioner are aligned with the smooth-surfaced columns on the vessel stud. Once the tensioner has been fully inserted over the stud, the tensioner is rotated approximately 60° so that the columns of female threads within the stud tensioner engage the columns of male threads on the vessel stud.

The roto-lock engagement system, like other prior art improvements, successfully reduces the time required for stud engagement. The necessity of a specially constructed stud, however, reduces the desirability of this approach. Use of the roto-lock engagement system requires proper alignment of the columns of thread before insertion, and rotation of the tool to effect engagement. If these processes are done mechanically, the new apparatus contributes to maintenance time and tool cost. If the processes are done manually, the operator is subject to radiation exposure.

It would therefore be advantageous to construct an improved version of the stud tensioner tool, which version eliminates the manual threading system, thereby reducing the time required to engage and disengage the vessel stud and also reducing the radiation exposure of the operator. It would be advantageous if this improvement required no significant additions of hardware which would serve to increase the cost of construction of the tensioner tool and which would also serve to increase the time required to maintain and repair the tool. Finally, it would be advantageous to construct a stud tensioner which requires no special alignment during the engagement process and which is adaptable to existing vessel studs so that it may be used in current refueling operations.

SUMMARY OF THE INVENTION

The time required for a stud tensioner tool to engage and disengage a vessel stud is substantially reduced by a quick-acting stud tensioner tool. The tool is lowered over a reactor vessel stud by a hoist. As the mass of the tool is transferred from the hoist to the vessel stud and surrounding support structure, a spring and wedge action causes the tool to engage and grip the upper end of the vessel stud. After the tool has performed the service of elongating the vessel stud, a lifting force applied to the tool by the hoist overcomes the force of the spring action and results in a wedging disengagement of the vessel stud. The tool may thereafter be lifted from the vessel stud and transferred to the next vessel stud.

DESCRIPTION OF THE PREFERRED EMBODIMENT

Figure 1:
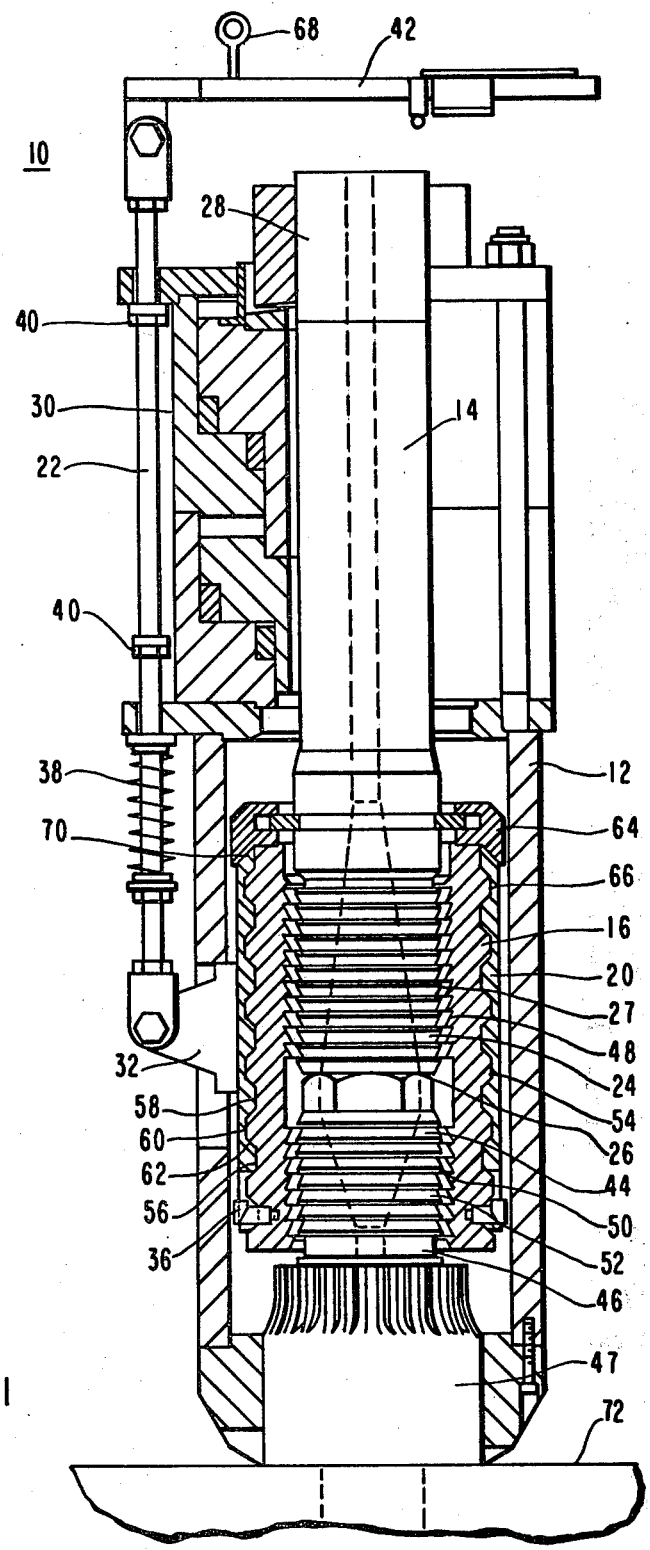
FIG. 1 shows in elevation relevant portions of the quick-acting stud tensioner tool, which is shown disengaged from the reactor vessel stud.
Figure 2:
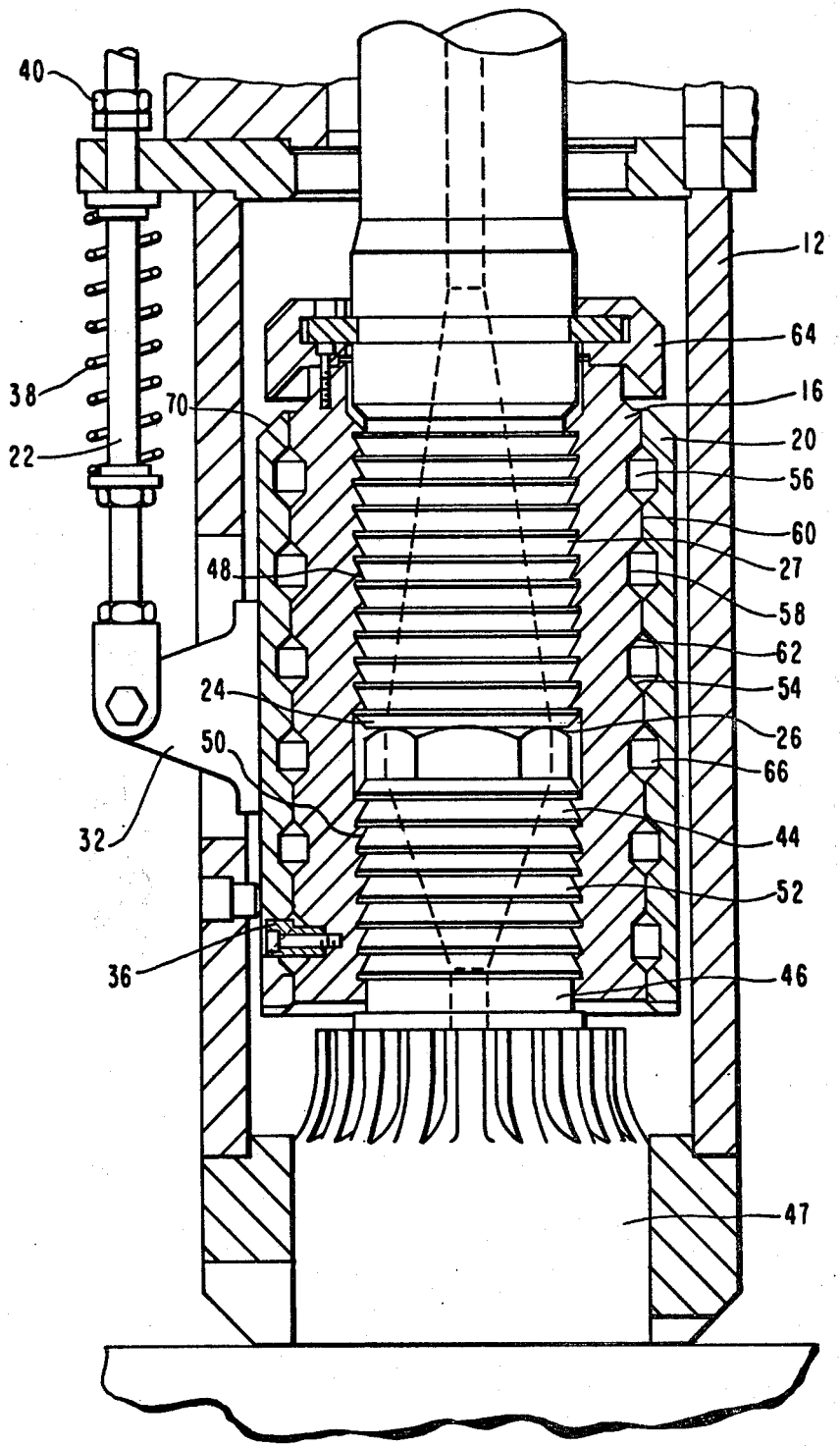
FIG. 2 shows in elevation the detail of that portion of the quick-acting stud tensioner tool which grips the vessel stud. In this figure, the tool has engaged the vessel stud.

In accordance with the principles of the invention, a quick-acting stud tensioner tool is disclosed for effecting rapid engagement and disengagement of a reactor vessel stud for the purpose of loosening or tightening a vessel stud nut. FIG. 1 and FIG. 2 depict in elevation relevant portions of the tool. In FIG. 1 the tool is disengaged from the vessel stud. In FIG. 2 the tool is engaged with the vessel stud.

The quick-acting stud tensioner tool 10 comprises a tensioner housing 12, a puller bar 14, a split gripper 16 comprised of a plurality of sections, a cylindrical gripper sleeve 20, a plurality of actuator rods 22 and a hydraulic cylinder assembly 30. These components operate cooperatively to effect immediate engagement of the vessel stud upon insertion of the tool over the vessel stud. A transfer of the mass of the tool 10 from a hoist to a vessel stud and surrounding support structure releases a spring action, which results in a wedging engagement of the vessel stud. The spring action forces the sections of the split gripper 16 to close around an upper end of the vessel stud.

A force of elongation, that is, a force which lifts the upper end of the vessel stud relative to an upper surface of the reactor vessel head, is then applied to free the vessel stud nut for tightening or loosening. The elongation force compresses the reactor vessel head against the reactor vessel flange, resulting in compression of the vessel seal and "elongation" of the vessel stud.

Following is a detailed description of the structure and operation of the quick-acting stud tensioner tool 10. A lower end 24 of the puller bar 14, which abuts against a top 26 of the reactor vessel stud 46, is comprised of a plurality of grooves defining threads 27, which circle the circumference of the puller bar 14. Relative to the outermost radial point, these threads 27 are flat on the upper surface and slope downward on the lower surface to form wedges. The upper end 28 of the puller bar 14 is attached to the tensioner housing 12 through the hydraulic cylinder assembly 30, which is comprised of a plurality of hydraulic cylinders for applying a force of elongation to a vessel stud 46.

The actuator rods 22 are attached to a common structure, the top plate assembly 42, which is the point at which a lifting force is applied to the tool 10. This lifting force results in a corresponding upward movement of the actuator rods 22 until the force is transferred to the tensioner housing 12 by an actuator stop nut 40 on each actuator rod 22. Each actuator rod 22 is attached by some means such as an actuator lug 32 and screws to the single gripper sleeve 20.

The cylindrical gripper sleeve 20 encloses the split gripper 16, whose sections are positioned around the lower end 24 of the puller bar 14 and the upper end 44 of the reactor vessel stud 46. A lower support wedge 36 is attached by some means such as a screw to the lower end of each section of the split gripper 16. Each actuator rod 22 is biased in the downward direction by some means such as an actuator spring 38, forcing the gripper sleeve 20 against the lower support wedge 36. The upward limit of travel of each actuator rod is defined by the actuator stop nut 40.

The plurality of sections 18 of the split gripper 16, when pressed radially inward, form a cylindrical shaped structure comprising as a whole the split gripper 16 which closes around the lower end 24 of the puller bar 14 and the upper end 44 of the vessel stud 46. The upper interior surface of the split gripper 16 is grooved around the circumference to form threads 48 which complement the threads 27 in the lower end 24 of the puller bar 14. Each tooth 48 has a lower surface which is flat and an upper surface which slopes up and in. When the split gripper 16 is forced to close on the lower end 24 of the puller bar 14, the two surfaces mate resulting in substantially complete surface contact.

The lower interior surface of the split gripper 16 is grooved around the circumference to form teeth 50, which are flat on the upper surface and slope down and in on the lower surface to form wedges. These teeth 50, when the split gripper is forced to close, mate with complementary teeth 52 in the upper end 44 of the vessel stud 46, resulting in substantially complete surface contact. The teeth 52 in the vessel stud 46 are flat on the lower surface and slope up and in on the upper surface, enabling the split gripper 16 to retain engagement of the vessel stud 46 while the elongation force of the hydraulic cylinder assembly 30 is applied to the puller bar 14 and translated to the vessel stud 46 through the split gripper 16.

The reactor vessel studs of some units in current use have threads at the upper end 44 rather than the arrangement of teeth described herein. Use of the quick-acting stud tensioner 10 on these threaded studs requires installation of an adapter (not shown) to facilitate engagement of the stud.

As best seen in FIG. 2, the outer surface 54 of the split gripper 16 makes sliding contact with the inner surface of the gripper sleeve 20 and is marked by a plurality of grooves defining a series of channels 56 around the circumference of the split gripper 16. Each channel 56 is comprised of a base surface 58 equal in width to, and parallel to the plane of, the surface 60 between each channel 56, and two channel walls 62, symmetric about the circumferential center line of the channel and sloping so that the width of the channel is narrowest at the base surface 58. Attached by means of screws (FIG. 2) to the top of each section of the split gripper 16 is an upper support wedge 64 for translating the upward motion of the gripper sleeve 20 into outward radial motion of the split gripper 16 when the split gripper 16 is being disengaged from stud 46 and from puller bar 14.

As best seen in FIG. 2, the inner surface of the gripper sleeve 20 is comprised of a plurality of grooves defining channels 66 of the same configuration as those on the outer surface 54 of the split gripper 16. When no external force is applied to the top plate assembly 42, the gripper sleeve 20 is biased by means of the actuator springs 38 on the actuator rods 22 against the lower support wedge 36, causing the channels 66 in the gripper sleeve 20 to be aligned with the channels 56 in the split gripper 16 and causing the surface contact between the gripper sleeve 20 and the split gripper 16 to be limited to the surface area between the channels (see FIG. 2). When an external lifting force is applied to the top plate assembly 42, the gripper sleeve 20 slidingly mates with the split gripper 16 until substantially complete surface contact is obtained (see FIG. 1).

For the purpose of describing the operation of the quick-acting stud tensioner, it will be assumed that a nuclear reactor is being refueled. To accomplish this it is necessary to detension the reactor vessel studs by use of the quick-acting stud tensioner tool 10 and then to remove the studs from the reactor vessel so that the reactor vessel head may then be lifted. It will further be assumed that the quick-acting stud tensioner tool 10 is now attached to a vessel stud 46, that the nut loosening process has been completed on this stud and that the tool is now ready to be transferred to the next vessel stud 46.

Movement of the quick-acting stud tensioner tool 10 between vessel studs 46 is accomplished by use of a hoist and monorail system (not shown). The hoist is attached to eye bolts 68 which are affixed in the top plate assembly 42 by appropriate means such as welding. The top plate assembly 42 is bolted to each of the actuator rods 22. As the hoist raises the tool at the eye bolts 68, the lifting force is transferred through the actuator rods 22 and the actuator lugs 32 to the gripper sleeve 20.

After a short movement upward, the leading edge 70 of the gripper sleeve 20 contacts the lower edge of the upper support wedge 64. Because the plane of the two contacting surfaces is oriented approximately 45° off horizontal, the gripper sleeve 20 begins to pull the upper support wedge 64, and in turn the sections of the split gripper 16, radially outward from the lower end 24 of the puller bar 14 and the upper end 44 of the reactor vessel stud 46. After the gripper sleeve 20 has forced the sections of the split gripper 16 to disengage from the reactor vessel stud 46 and has forced the channels 56 in the outer surface 54 of the split gripper 16 to mate with the channels 66 in the gripper sleeve 20 so that there is substantially complete surface contact between the two parts, the lifting force on the actuator rods 22 is translated to the tensioner housing 12 by means of the actuator stop nuts 40. With the quick-acting stud tensioner tool 10 now disengaged from the reactor vessel stud 46, the lifting force of the hoist raises the entire tool off of the stud 46.

The quick-acting stud tensioner tool 10 is then positioned atop the next reactor vessel stud 46. Once in position, the tensioner tool 10 is lowered over the vessel stud 46 and stud nut 47 until the lower end 24 of the puller bar 14 contacts the upper end 44 of the vessel stud 46 and the base of the quick-acting stud tensioner tool 10 contacts the reactor vessel head 72. At this point, the mass of the tensioner housing 12 is transferred to the reactor vessel (not shown). Further lowering of the hoist results in the actuator rods 22 being drawn downward by the force of the actuator springs 38 and the mass associated with the actuator rods 22.

As the actuator springs 38 draw the actuator rods 22 and the attached gripper sleeve 20 downward, the angled channel walls 62 of the mated channels 56, 66 in the gripper sleeve 20 and the split gripper 16 force the split gripper 16 inward. This motion continues until the gripper sleeve 20 and the split gripper 16 contact only at the area between the channels on each surface and the lower end of the gripper sleeve 20 contacts the lower support wedges 36 (see FIG. 2). At this point the lower support wedges 36 halt the downward motion forced by the actuator springs 38. The inward motion of the sections 18 of the split gripper 16 has resulted in a mating of the teeth 48, 50 in the inner surface of the split gripper 16 with the teeth 27, 52 in the outer surface of the lower end 34 of the puller bar 14 and the upper end 44 of the vessel stud 46. The tensioner tool 10 has now engaged the vessel stud 46 and the detensioning process is ready to begin.

Detensioning is accomplished by energizing the hydraulic cylinder assembly 30, applying a lifting force to the upper end 28 of the puller bar 14, against the mass of the tensioner housing 12, reactor vessel head 72, and reactor vessel. This lifting force is translated from the puller bar 14 through the split gripper 16 to the upper end 44 of the reactor vessel stud 46. It results in a compression of the seal (not shown) between the reactor vessel head 72 and reactor vessel, which in turn removes the pressure from the reactor vessel stud nut 47. The stud nut 47 is then loosened a few turns by some appropriate means, such as by hand wrench or by an integral wrench attachment (not shown). When nut loosening is completed, the hydraulic cylinder assembly 30 is deenergized and the compression of the seal between the reactor vessel head and the reactor vessel is relaxed. The detensioning process completed, the quick-acting stud tensioner tool 10 is now ready to be moved to the next vessel stud.

Hence, use of the quick-acting stud tensioner tool 10 reduces the time required to engage and disengage the vessel stud and also reduce exposure of the operator to radiation. No additional hydraulic valves or automated threading systems with their attendant maintenance problems and additional costs are required. Finally, the quick-acting stud tensioner requires no special alignment, as does the roto-lock tensioner, and is adaptable to the vessel studs of units currently in the field.

What is claimed is:

1. An apparatus for enabling loosening and tightening of a stud nut on a reactor vessel stud by forcing compression of a seal between a reactor vessel head and a reactor vessel flange, said apparatus having a certain mass and comprising:

gripper means for grasping the reactor vessel stud comprising a split gripper comprised of a plurality of sections which are movable to a closed position to form a cylinder with an inner surface in gripping contact with an upper end of the vessel stud nut, said gripper means also including a cylindrical gripper sleeve, having an inner surface surrounding and in sliding contact with said split gripper, disposed for movement up and down, and having wedge means on at least one of said gripper sleeve and said split gripper controlling the opening and closing of said split gripper around the vessel stud to respective disengaged and engaged positions relative to said stud, actuating means for causing said gripper means to move to said engaged and disengaged positions comprising a plurality of vertically disposed actuator rods affixed by securing means at a lower end to said gripper sleeve and at an upper end to a common plate, said actuator rods being movable longitudinally by movement of said common plate to a first position wherein said gripper sleeve is moved in one longitudinal direction to move said split gripper to said engaged position, said actuator rods being movable longitudinally to a second position wherein said gripper sleeve is moved in the longitudinal direction opposite said one longitudinal direction to said disengaged position, and means for applying a force of elongation to the vessel stud so that the stud nut may be loosened or tightened.

2. An apparatus according to claim 1 including a housing structure containing said gripper means and wherein said means for applying a force of elongation is fixedly attached to said housing structure and remains stationary relative to said housing structure while the elongation force is applied to said gripper means, drawing said gripper means upward relative to said housing structure.

3. An apparatus according to claim 2 wherein said means for applying a force of elongation comprises an assembly of hydraulic cylinders.

4. An apparatus according to claim 3 including:
a longitudinally movable puller bar which affixes at an upper end to said means for applying a force of elongation, said puller bar having thread means wherein at a lower end which are engaged with complementary thread means on said split gripper when said split gripper is in its engaged position.

5. An apparatus according to claim 4 wherein a lower end of said puller bar has a contoured exterior surface which mates with a complementary contoured interior surface in an upper end of said split gripper when said split gripper closes around the vessel stud, so that upward movement of said puller bar is translated to said split gripper.

6. An apparatus according to claim 4 wherein a lower end of said split gripper has a contoured interior surface which mates with a complementary contoured exterior surface in an upper end of the vessel stud when said split gripper closes around the vessel stud, so that an upward force applied to said split gripper is translated to the vessel stud.

7. An apparatus according to claim 1 wherein said wedge means includes a plurality of upper support wedges, each fixedly attached to one section of said split gripper for translating longitudinal motion of said gripper sleeve in said opposite longitudinal direction to outward radial motion of said split gripper, drawing the sections of said split gripper away from the vessel stud to said disengaged position.

8. An apparatus according to claim 1 wherein said gripper sleeve has a contoured interior surface arranged in sliding contact with a contoured exterior surface of said split gripper so that downward motion of said gripper sleeve is translated to inward radial motion of said split gripper, closing said split gripper around the vessel stud.

9. An apparatus according to claim 2 including biasing means acting on each of said actuator rods normally biasing said actuator rods downward relative to said housing structure to normally move said split gripper to close around the vessel stud.

10. An apparatus according to claim 9 wherein the biasing means comprises a spring.

11. An apparatus according to claim 1 wherein stop means are provided in at least one of said actuator rods to limit longitudinal movement thereof in at least one direction.

12. An apparatus according to claim 11 wherein said stop means limit longitudinal movement of said one actuator rod in both directions.

13. An apparatus according to claim 4 including means interacting between said puller bar and said split gripper for limiting relative longitudinal movement between said puller bar and said split gripper.

* * * * *